US009244895B2

(12) United States Patent
Toebes et al.

(10) Patent No.: US 9,244,895 B2
(45) Date of Patent: *Jan. 26, 2016

(54) EDITING WEB PAGES (71) Applicant: Cisco Technology, Inc., San Jose, CA (US)

(72) Inventors: John A. Toebes, Cary, NC (US); Gary T. Chou, San Francisco, CA (US); John C. Davi, Palo Alto, CA (US); Glenn T. Millican, III, Mountain View, CA (US); Josh D. Williams, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 479 days.

This patent is subject to a terminal disclaimer.

(21) Appl. No.: 13/734,620

(22) Filed: Jan. 4, 2013

(65) Prior Publication Data

US 2013/0124977 A1       May 16, 2013

Related U.S. Application Data

(63) Continuation of application No. 12/247,194, filed on Oct. 7, 2008, now Pat. No. 8,375,294, which is a continuation-in-part of application No. 10/902,415, filed on Jul. 29, 2004, now Pat. No. 7,698,631.

(51) Int. Cl.
*G06F 17/24* (2006.01)
*G06F 17/22* (2006.01)
*G06F 17/30* (2006.01)

(52) U.S. Cl.
CPC ............ *G06F 17/2247* (2013.01); *G06F 17/24* (2013.01); *G06F 17/30893* (2013.01)

(58) Field of Classification Search
CPC   G06F 17/2247; G06F 17/24; G06F 17/30893
See application file for complete search history.

(56) References Cited

U.S. PATENT DOCUMENTS

| 6,496,203 | B1 | 12/2002 | Beaumont et al. |
| 6,578,000 | B1 | 6/2003 | Dodrill et al. |
| 6,643,663 | B1 | 11/2003 | Dabney et al. |
| 6,785,891 | B1 | 8/2004 | Allen et al. |
| 7,000,184 | B2 | 2/2006 | Matveyenko et al. |

(Continued)

OTHER PUBLICATIONS

Editlet, "Browser Based, Cross Platform", [online], [retrieved on Feb. 9, 2005]. Retrieved from the Internet: <URL: http://www.editlet.com> Copyright 1998-2003 Akmin Technologies, 1 page.

(Continued)

*Primary Examiner* — Kyle Stork
(74) *Attorney, Agent, or Firm* — Leon R. Turkevich (57) ABSTRACT

In particular embodiments, a method for editing a web page includes identifying a plurality of components that collectively form a programmatic representation of a first web page. At least one of the components has content that dynamically changes in response to data retrieved externally from the content. A second web page is generated. The second web page includes a plurality of parameters. Each parameter of the second web page corresponds to a respective one of the identified plurality of components. One or more modifications made to the plurality of parameters are interpreted. A programmatic representation of a third web page is generated, the generation based at least in part on the interpretation.

20 Claims, 5 Drawing Sheets

(56) References Cited

U.S. PATENT DOCUMENTS

| | | |
|---|---|---|
| 7,062,506 B2 | 6/2006 | Taylor et al. |
| 7,316,003 B1 | 1/2008 | Dulepet et al. |
| 7,386,786 B2 | 6/2008 | Davis et al. |
| 7,698,631 B1 | 4/2010 | Toebes |
| 8,375,294 B2 | 2/2013 | Toebes et al. |
| 2002/0059344 A1 | 5/2002 | Britton et al. |
| 2003/0204810 A1 | 10/2003 | Dam et al. |
| 2004/0148565 A1 | 7/2004 | Davis et al. |
| 2004/0148576 A1 | 7/2004 | Matveyenko et al. |
| 2004/0261023 A1 | 12/2004 | Bier |
| 2006/0143562 A1 | 6/2006 | Seurig et al. |
| 2006/0265355 A1 | 11/2006 | Taylor et al. |
| 2007/0162420 A1 | 7/2007 | Ou et al. |
| 2008/0244740 A1 | 10/2008 | Hicks et al. |
| 2009/0006953 A1 | 1/2009 | Perantatos et al. |
| 2009/0077170 A1 | 3/2009 | Milburn et al. |

OTHER PUBLICATIONS

Macromedia, Inc., Macromedia Dreamweaver MX 2004, "Build Professional Websites and Applications", [online], [retrieved on Feb. 9, 2005]. Retrieved from the Internet: <URL: http://www.macromedia.com/software/dreamweaver> Copyright 1995-2005, 3 pages.

Yahoo! Inc., "Web Site Editors", [online], [retrieved on Feb. 9, 2005]. Retrieved from the Internet: <URL: http://dir.yahoo.com/computers_and_internet/software/internet/world_wide_web/html_editor> Copyright 2005, 1 page.

Evrsoft, "Software" (i.e., "1st p. 2000, Version 2.0 Free Edition"), [online], [retrieved on Feb. 9, 2005]. Retrieved from the Internet: <URL: http://www.evrsoft.com> Copyright 2005, 2 pages.

Microsoft Corporation, Microsoft Office Online, "Front Page", [online], [retrieved on Feb. 9, 2005]. Retrieved from the Internet: <URL: http://office.microsoft.com/en-us/FX010858021033.aspx> Copyright 2004, 2 pages.

Yahoo! Inc., "Yahoo! GeoCities", "Yahoo! PageBuilder", [online], [retrieved on Feb. 9, 2005]. Retrieved from the Internet: <URL: http://geocities.yahoo.com/v/pb.html> Copyright 2005, 2 pages.

Vesperman, "Tracking Changes in CVS," Jun. 14, 2002, available from: <http://linuxdevcenter.com/lpt/a/2443>, pp. 1-6.

Jammer, "Obfuscator," http://web.archive.org/web/20050728132930/rzr.online.rf/docs/shop/jammer.htm, Feb. 8, 2004, 6 pages.

HTML, "HTML (Un)Compress 6.12,"http://web.archive.org/web/20020823002106/home,tiscali.be/Jacobs.Jan/htmlcomp/index.htm, Aug. 1, 2002, 2 pages.

Joomlart, "Joomla/Mambo Layout," http://www.joomlart.com/tutorials/templates_tutorial/mambo_layout.html, Jun. 24, 2005, 6 pages.

Drupal, "New Drupal Theme Generator—Generate 100's of Themes," Oct. 17, 2005, http://drupal.org/node/34324, 22 pages.

```
<h1><img src="images/h1_status.gif" alt="status"></h1>
<p>This is a test paragraph with a Link to <a
href="http://www.google.com">Google</a>
 to show you how a paragraph can work.</p>
<ul><li>List Item 1</li>
<li>List Item 2 which links to <a href="http://www.yahoo.com">Yahoo</a>
 as an example.</li>
<li>Third List Item</li>
</ul>
<table border="1"><tr><td> First Cell</td>
<td> Second Cell</td>
</tr>
<tr><td> Third Cell</td>
<td> Fourth Cell</td>
</tr>
</table>
<img src="/techCenter/proj/test/images/circle.jpg" alt="Circle" height="50"
width="50"><a href="/techCenter/proj/test/upload/empty.txt">Sample Text
File</a>
```

EDITING WEB PAGES

This application is a continuation of U.S. patent application Ser. No. 12/247,194, filed Oct. 7, 2008, which is a continuation-in-part of U.S. patent application Ser. No. 10/902,415, filed Jul. 29, 2004 and issued on Apr. 13, 2010 as U.S. Pat. No. 7,698,631.

TECHNICAL FIELD

This disclosure relates generally to editing web pages.

BACKGROUND

Managing a large web site typically involves editing a large number of files that may include graphics, HyperText Markup Language (HTML), Javascript, stylesheets, applets, and other supporting files. Maintaining a visually appealing and functional web site often involves collating several files and various types of web site software at a particular time and location. Web site developers often desire to work on web sites as a whole and typically would prefer to be able to perform maintenance without affecting the main site.

As web sites have become more dynamic in nature, the HTML pages generated for the end user or consumer are often constructed from a combination of programming scripts (in languages such as PHP or Perl) and database elements, such that the only time the HTML version is seen is typically when the end user is viewing the web site. This dynamic nature has further separated the components that a developer uses to represent the site and the final organization and visualization of the site. Dynamic web pages thus present unique challenges that are insufficiently met by some conventional web page editing applications.

DESCRIPTION OF EXAMPLE EMBODIMENTS

Overview

In particular embodiments, a method includes identifying a plurality of components that collectively form a programmatic representation of a first web page. At least one of the components has content that dynamically changes in response to data retrieved externally from the content. A second web page is generated. The second web page includes a plurality of parameters. Each parameter of the second web page corresponds to a respective one of the identified plurality of components. One or more modifications made to the plurality of parameters are interpreted. A programmatic representation of a third web page is generated, the generation based at least in part on the interpretation.

Particular embodiments may provide a user with a simulated or real-time visualization platform that facilitates and otherwise enhances web page editing and maintenance. Users, such as web site developers, may work with the visualization platform to edit, in a "live" mode, the static and dynamic components of a web page without necessarily needing all of the web site software, programs, scripts, or files stored locally on their machine. In addition, a user may choose to perform edits using local tools that are exclusive to visual representation or presentation, and may do so even if the user has little or no knowledge of any programming associated with the visualizations the user controls. In some embodiments, multiple users may simultaneously work on different portions of a web site and check back in any finalized edits to the system in a seamless manner. At least some of the above editing capabilities may exist independent of whether the user is online or offline. While specific advantages have been enumerated above, particular embodiments may provide all, some, or none of the enumerated advantages. Particular embodiments may provide other advantages.

DESCRIPTION

Figure 1:
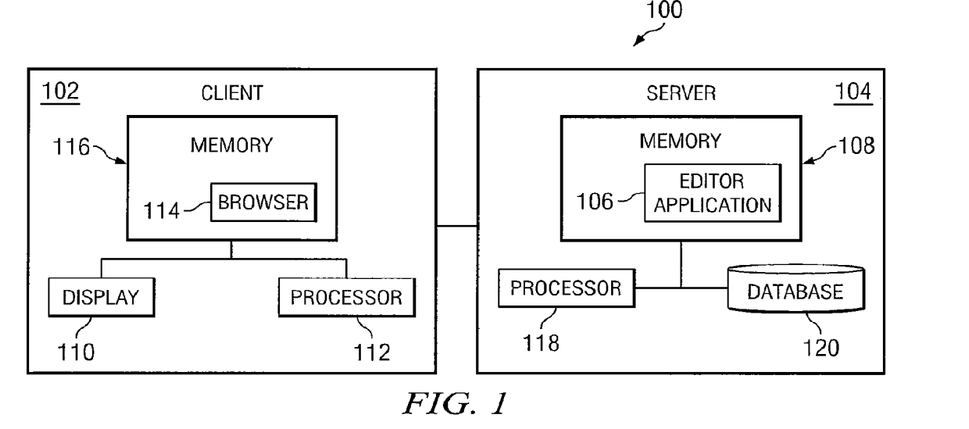
FIG. 1 is a block diagram illustrating a system that generally includes a client in communication with a server according to one embodiment.

FIG. 1 is a block diagram illustrating a system 100 that generally includes a client 102 in communication with a server 104. As explained further below, an Editor Application 106, which may be stored, for example, within memory 108 of server 104, generally enables a user (e.g., a web site developer) to edit one or more web pages. For example, Editor Application 106 may provide a client-side user with a Graphical User Interface (GUI) that dynamically updates a visualization of any edits or manipulations the user may perform with regard to a web page layout. In addition, Editor Application 106 may automatically generate computer code corresponding to any manipulation of the static and dynamic components of a web page. In some embodiments, Editor Application 106 may include at least some of the above functionality independent of the status of the communicative link(s) between client 102 and 104. More specific examples regarding the various components of the system 100 shall be discussed in turn.

Client 102 generally refers to any suitable device(s) capable of communicating with server 104. For example, client 102 may be a computer (e.g., a laptop or a desktop), a personal digital assistant, a cellular telephone, a mobile handset, one or more other device(s) capable of communicating with server 104, or any combination of the preceding. In this example, client 102 generally includes a display monitor 110, a processor 112, and browser software 114, which is stored within memory 116; however, client 102 may include additional or alternative elements not shown in FIG. 1, such as, for example, disk drives, keyboard, mouse etc. Memory 116 may also include additional elements, such as, for example, applications programs, network, communication programs, operating system software data etc. Browser 114 generally refers to any suitable software application that enables a user to display and interact with information (e.g., text, images, videos, music, etc.) typically located on a web page at a web site (e.g., a web site on the World Wide Web, a local area network, hosted by server 104, etc.).

The communication between client 102 and server 104 may be effected by any interconnecting system capable of transmitting audio, video, signals, data, messages, or any combination of the preceding. Such interconnecting systems may include, for example, all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. Client 102 or server 110 may execute with any of the well-known MS-DOS, PC-DOS, OS-2, MAC-OS, WINDOWS™, UNIX, or other appropriate operating systems, including future operating systems. In some embodiments, some or all of the functionality or structure of client 102 and server 104 may be embodied in a single device, or in one or more other devices not illustrated in FIG. 1. In some such embodiments, the communication between client 102 and server 104 may be internally, such as, for example, via a system bus.

Server 104 generally refers to any suitable device capable of communicating with client 102. For example, server 104 may be a file server, a domain name server, a proxy server, a web server, an application server, a computer workstation, a handheld device, one or more other devices operable to communicate with client 102, or any combination of the preceding. In some embodiments, server 104 may restrict access only to a private network (e.g. a corporate intranet); or, in some other embodiments, server 104 may publish pages on the World Wide Web. In this example, server 104 generally includes a processor 118, a database 120, and various software applications stored within memory 108, including, for example, Editor Application 106; however, any suitable server(s) 104 may be used. Database 120 generally stores data, and facilitates addition, modification, and retrieval of such data. In some embodiments, database 120 may store at least a portion of the information corresponding to a web site. Database 120 can include any file system, data collection or other storage format or architecture for holding information. Although FIG. 1 illustrates a single database 120 residing within server 104, database 120 may alternatively reside separate from server 104 or may include multiple databases 120.

In the illustrated embodiment, Editor Application 106 is a server-side software application residing within memory 108 of server 104; however, Editor Application 106 may reside at any suitable location (e.g., at a client-side location) and may be embodied in any suitable computer-readable medium. Editor Application 106 may use any suitable programming language(s), such as, for example, PHP, Perl, ASP or ASP.NET, JSP, or some other suitable language, including future languages. In this example, Editor Application uses the Common Gateway Interface (CGI); however, any suitable interface may be used.

In operation, system 100 generally performs acts that enable web page editing. A summary of such acts, according to one example embodiment, is as follows. Upon a request to edit one or more web pages, Editor Application 106 may define a markup description of each web page(s) in terms of logical components that collectively form the web page(s). For example, at least some of the components may correspond to the individual static or dynamic features of the web page(s). These components are used to generate one or more representational web pages. The representational web page(s) may include embedded tags, for example, each of which identifies a respective one or more of the previously defined components. These embedded tags may be used to effect web page editing in a "stateless" manner that is wholly independent of the particular web editor used, as explained further below. The representational web page(s) are communicated to client 102, where browser 114 renders their visualization to display 110. In various embodiments, the representational web page(s) and their corresponding embedded tags may substantially, or even perfectly, emulate one or more, or even all of the visual or functional features of the original web page(s) respectively represented.

Any of a variety of client-side web editing tools may be used to edit the representational web pages communicated to client 102 (e.g., text editors, HTML editors, HTML GUI editor, etc.). In response to client-side input during the editing process, commands issued from browser 114 may be communicated to server 104. For example, a user may wish to manipulate or otherwise edit a particular dynamic component of a selected web page. The effects, if any, such commands might have on any of the previously defined components are identified by the embedded tags of a modified web page representation communicated to server 104. The original web page may or may not be modified accordingly at this point.

Editor Application 106 generally processes any received changes. For example, Editor Application 106 may generate a preview of a modified web page, at least in part, by reconstructing the embedded tags received from client 102. The reconstruction effected by Editor Application 106 may include accessing or executing, where appropriate, any server-side files, data, scripts, programs, etc. corresponding to the modified static or dynamic components. In some embodiments, Editor Application 106 may continually communicate, on the fly, newly processed or modified information (e.g., a new or modified HTML document) between server 104 and client 102, thereby allowing backend processing of any dynamic components as a user manipulates the appearance of a web page representation.

A component is typically considered dynamic if it has content that may change automatically or frequently in response to different contexts or conditions (e.g., in response to predefined rules, variable user input, etc). More specifically, a particular web page component may be considered dynamic if it collates information and outputs corresponding HTML each time the web page is requested. Such collative acts may include, for example, retrieving data (e.g., photos, audio/video, user profiles and preferences, session status, tables, etc.), or executing one or more scripts or programs. The content of such a dynamic web page component may or may not be stored separately from the information it collates (e.g., the information may be stored separately within database 120 or some other database, which may or may not be stored within server 104). One example form of this dynamic information is an RSS feed.

By way of comparison, a component may be considered purely static, for example, if the component is stored on server 104 in the same form that is eventually communicated to browser 116. In other words, a particular web page component may be considered static if it effects the communication of the same information to a web browser independent of any input variance that might occur during a download request of the web page. Some examples of static components may include services via text, photos, Flash animation, audio/video, interactive menus and navigation, etc.

Users of system 100, such as web site developers, may work with the web page representations generated by system 100 without necessarily needing all of the web site software, programs, scripts, or files stored locally on their machine. In other words, a user may visualize edits of both static and dynamic web page components, even if all the files associated with a particular dynamic component are not made available to client 102. In addition, a user may choose to perform edits using local tools that are exclusive to visual representation or presentation, and may do so even if the user has little or no knowledge of any programming associated with the visualizations the user is modifying.

In some embodiments, such editing capabilities may exist independent of whether the user is online or offline with respect to server 104. For example, during the editing process, an editing state may be stored with the parameters in the particular web page representation(s) actively displayed by browser 114. In this respect, the editing approach may be "stateless" with respect to the interaction between client 102 and server 104. That is, the current state of the editing session is not necessarily saved with external variable, but rather may be represented by conditions and states that are embedded within the client-side web page representation. In this manner, a user may be able to edit one or more web pages even if the user does not have a present connection to server 104.

A final version of the web page(s) can be generated at any time (including storing intermediate changes back to the original web page). The final version may be based, at least in part, on the parameters stored, and perhaps modified, in the web page representation(s). In some embodiments, the edited web page representations may include standard HTML, which may be served up directly from the disk, for example, by an unmodified web server 104. Additional details regarding the acts that may be performed by system 100 to enable web page editing are described further below with reference to FIGS. 2 through 7.

Figure 2:
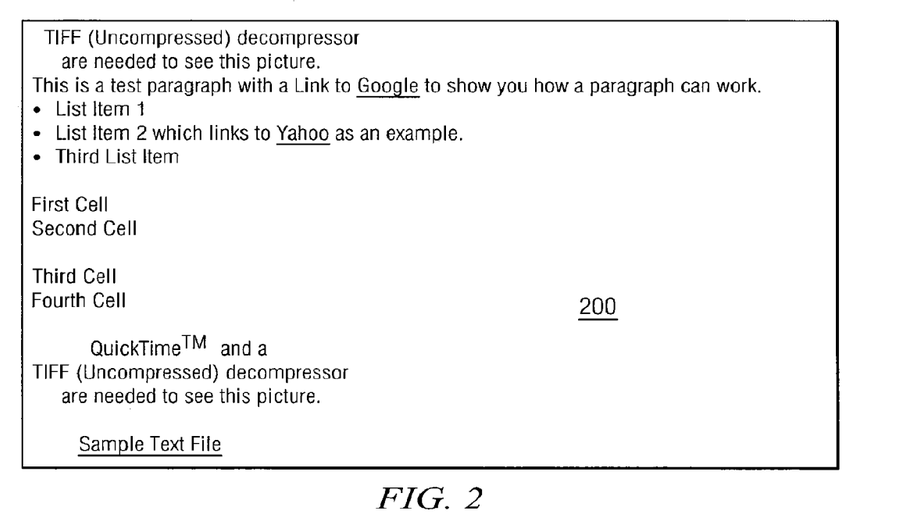
FIG. 2 illustrates an example portion of a web page that may be edited by the system of FIG. 1.
Figure 3:
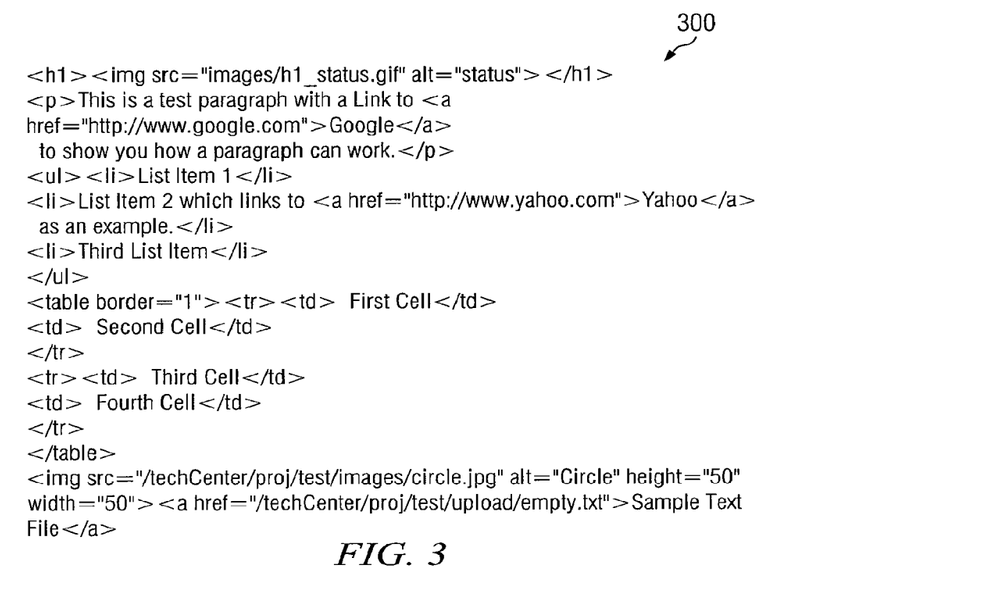
FIG. 3 illustrates example HTML corresponding to the web page portion of FIG. 2.

FIG. 2 illustrates an example portion of a web page 200 that may be edited by system 100 according to one embodiment; and FIG. 3 illustrates example HTML 300 corresponding to web page portion 200 of FIG. 2.

Figure 4:
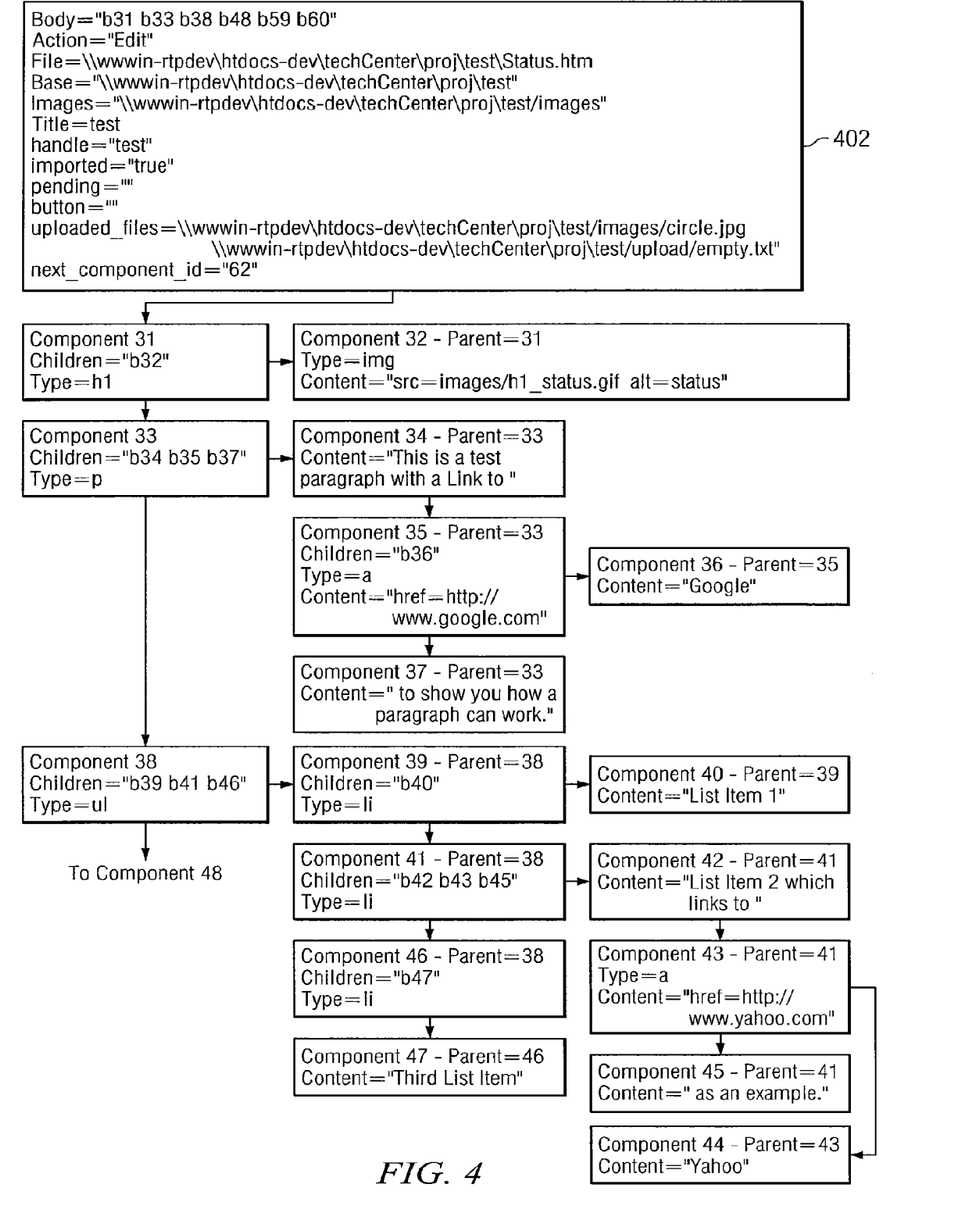
FIGS. 4 and 5 illustrate one example of defining the web page portion of FIG. 2 into logical components.
Figure 5:
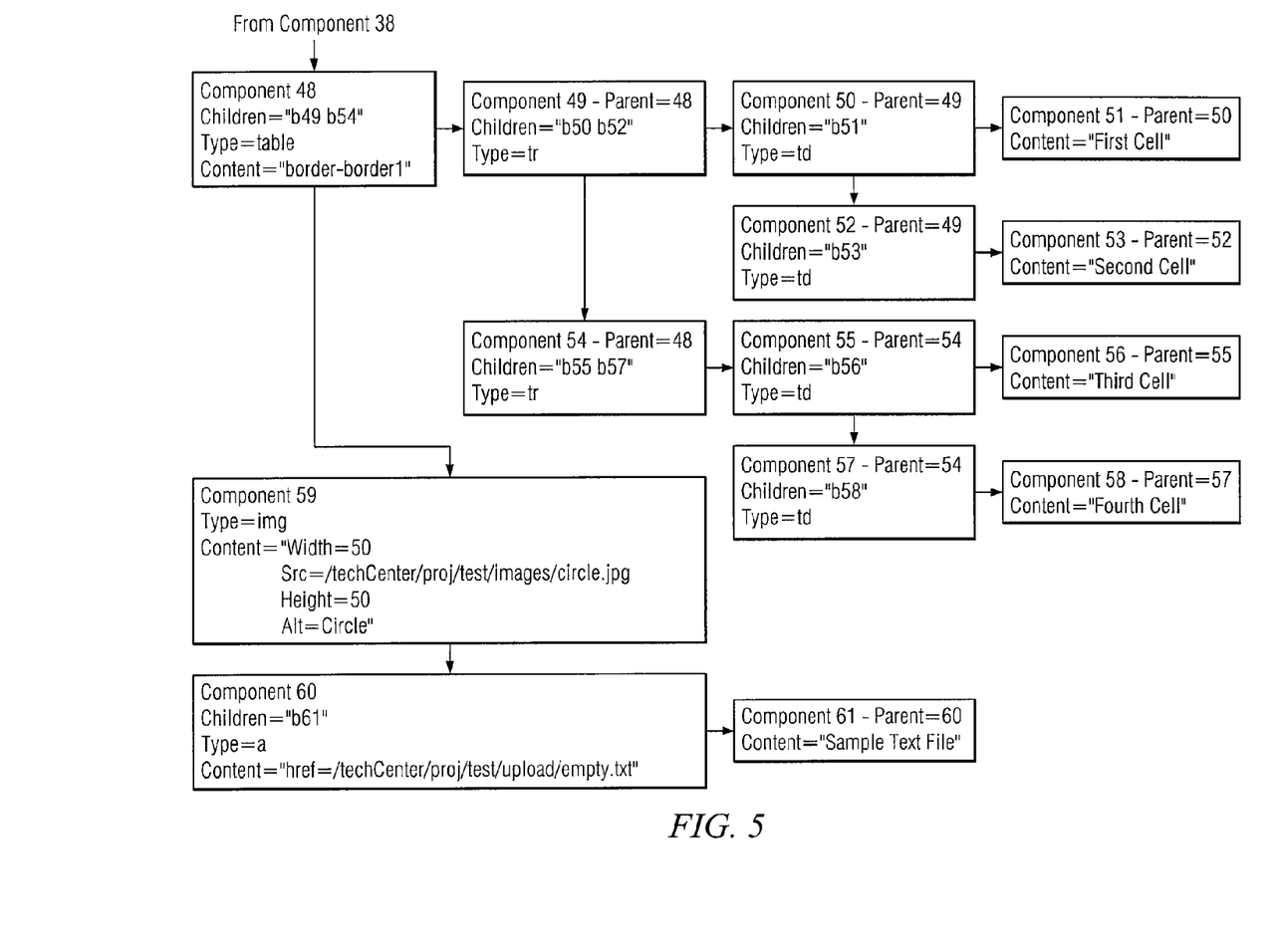

FIGS. 4 and 5 illustrate one example of defining the web page portion 200 of FIG. 2 into logical components, which are illustrated in FIGS. 4 and 5 as rectangles. In this example, Editor Application 106 defines web page 200 in terms of logical components, nesting as appropriate, and assigns an identifier to each component. The identifier generally names the component and defines the various editable attributes of the component, such as, for example, the visual layout of the component on web page 200 (e.g., the layout in terms of dimensions and position). In the illustrated example, each component is identified by respective numbers and further includes at least the following identifying parameters: Child, Parent, Type, and Content.

A Child parameter, if present, indicates a component that may be affected by attributes or other properties of one or more associated parent components. For example, in FIG. 4, Component 31 has a "b32" Child parameter, indicating that Component 32 is a child of Component 31. The corresponding children components (b31, b33, b38, b48, b59) of Component 402, however, are referred to as a "Body" type (a special type), rather than as children, because Component 402 is the top component of the example web page 200. Child information can also be indicated by the implicit relationship of the nesting of components within the HTML.

The arrows of FIGS. 4 and 5 indicate parent/child relationships between components. Thus, the arrow from Component 31 to Component 32 indicates Component 31 is the parent of Component 32 and, conversely, Component 32 is the child of Component 31. The parent/child relationship is also shown in the parameters within the components (e.g., "Parent=31" of Component 31).

A Type parameter, if present, generally identifies the component in terms of one or more classifications. For example, in FIG. 4, Component 31 includes a Type parameter of "h1," indicating Component 31 has a first-level header formatting, as defined in standard HTML (e.g., font size, indentation, etc.). Component 32, however, has a Type parameter of "img," which specifies an image. The type parameter can also be represented as HTML elements, such as, for example, the class or ID element of a DIV tag. The Content parameter of Component 32 is set to the location of the image so that the image can be retrieved and displayed. Some additional Type parameter examples, including some example uses and content that may correspond to such Type parameters, are shown in Table I, below:

TABLE I

| Type | Usage | Content |
|---|---|---|
|  | Standard text paragraph. | Text of the paragraph |
| Img | Image file. | Encoded image information |
| table | Table | Encoded table information |
| tr | Table Row | Encoded row information |
| td | Table column | Encoded column information |
| ul | Bulleted list | Nothing |
| ol | Numbered list | Nothing |
| li | List Element | Nothing |
| a | Link | Encoded link information |
| p | Paragraph | Nothing |
| h1 | Header Level 1 | Nothing |
| h2 | Header Level 2 | Nothing |
| h3 | Header Level 3 | Nothing |

If multiple parameter values are stored in a string, the values may be encoded, for example, by concatenation. For example, an image having four descriptive values for a Content parameter may be encoded as follows:

src%1falt%1fwidth%1ewidth%1f50%1fsrc%1f/tech-Center/proj/test/images/circle.jpg%1fheight%1f50%1falt%1fCircle The above example includes four fields: src, alt, height, and width, which are delimited by a non-printing character (%1f in this example) and separated from the actual values by another non-printing character (%1e in this case). This information can also be derived, for example, from the implicit representation of the HTML combined with a corresponding CSS file.

The above examples of defining the web page portion 200 of FIG. 2 into logical components are not exhaustive of all the ways in which a particular component may be defined and identified. Various embodiments may use any of a variety of additional or alternative defining and identifying schemes. For example, Table II, below, shows some additional information that may be used to define and identify the various components of a web page:

TABLE II

| Field | Usage |
|---|---|
| Body | List of top level components separated by spaces. |
| Action | The action that the user is requesting. |
| File | The original file which was read in |
| Base | The directory where all references are based off. |
| Images | The location where any images are stored. |
| Title | The title of the web page. |
| Handle | The project directory where the web page was contained. |
| Imported | Set to true to indicate that the file has been imported. This allows the user to know when it has to read in the file. |
| Pending | List of components pending to be deleted. This is the list of the most recently added components which are deleted if the user doesn't change the content after selecting add component. For example if you add a paragraph and then don't fill in the text field for the paragraph, it can be automatically deleted. |

TABLE II-continued

| Field | Usage |
| --- | --- |
| Button | Identifies the component associated with the current command. |
| uploaded_files | List of files that have been uploaded as part of editing. |
| next_component_id | The next component number to be assigned in creating a new component. |

In the illustrated example, the defined and identified components of web page 200 are used to generate one or more representational web pages. That is, the representational web page(s) include embedded tags, each of which includes the information corresponding to the previously defined and identified components. In this manner, server 104 can interpret any commands from client 102, and vice versa, by referencing the embedded tags preserved within the web page representations. For example, a tag embedded within in <DIV> ID may serve as an identifying reference, even if the component is manipulated on the html page or moved to a different page. According to a particular embodiment, an example portion of a web page representation using CSS may include multiple <DIV> embedded tags as follows:

```
<div id="wrapper">
    <div id="header">
        <div style="margin: 0px 10px; padding:10px 0px 0px 0px; line-height:0em;"><img src="../images/bg_header.jpg" /></div>
        <!-- Eos.Identifier.DOM.element.Start header -->
        <!-- Eos.Module.Section.Do.Not.Edit.Start nav_main
id="m_1102" --><script>EosJsRenderModule(1102)</script><!--
Eos.Module.Section.Do.Not.Edit.End nav_main -->
        <!-- Eos.Identifier.DOM.End -->
    </div>
    <div id="container">
        <div id="c1">
            <!-- Eos.Identifier.DOM.element.Start c1 -->
            <!-- Eos.Module.Section.Do.Not.Edit.Start blog_listing
id="m_1107" --><script>EosJsRenderModule(1107)</script><!--
Eos.Module.Section.Do.Not.Edit.End blog_listing -->
            <!-- Eos.Identifier.DOM.End -->
        </div>
        <div id="c2">
            <!-- Eos.Identifier.DOM.element.Start c2 -->
            <!-- Eos.Module.Section.Do.Not.Edit.Start ad
id="m_1106" --><script>EosJsRenderModule(1106)</script><!--
Eos.Module.Section.Do.Not.Edit.End ad -->
            <!-- Eos.Module.Section.Do.Not.Edit.Start tags
id="m_1108" --><script>EosJsRenderModule(1108)</script><!--
Eos.Module.Section.Do.Not.Edit.End tags -->
            <!-- Eos.Identifier.DOM.End -->
        </div>
    </div>
    <div id="footer">
        <!-- Eos.Identifier.DOM.element.Start footer -->
        <!-- Eos.Module.Section.Do.Not.Edit.Start footer
id="m_1101" --><script>EosJsRenderModule(1101)</script><!--
Eos.Module.Section.Do.Not.Edit.End footer -->
        <!-- Eos.Identifier.DOM.End -->
    </div>
</div>
```

By storing embedded tags within an HTML representation of an original web page in this manner, or some other analogous manner, system 100 may accurately and efficiently maintain the state of all the information pertaining to the various components of the web page. Similar web page representations may be communicated between server 104 and client 102 during an editing process. At any point in time, for example, an edited web page representation may be uploaded to server 104, where the information embedded within that page is parsed to recreate the information that server 104 may use to manage the programmatic representation of the web page.

With a separate CSS file carrying the visual style attributes of the web page components, the representational web page uses the structure of the HTML to encode information about the logical components that make up the web page. The ID attributes of the DIV tags may be used, for example, to indicate the type of module being rendered while the comments may be used, for example, to provide additional context information for the server 104 to be able to regenerate the programmatic components. The use of Javascript within the representational web page allows for rendering of either static data downloaded with the representational web page or dynamic data pulled from the server 104. Example acts related to editing web pages using embedded tags are described further with reference to FIGS. 6 and 7.

Figure 6:
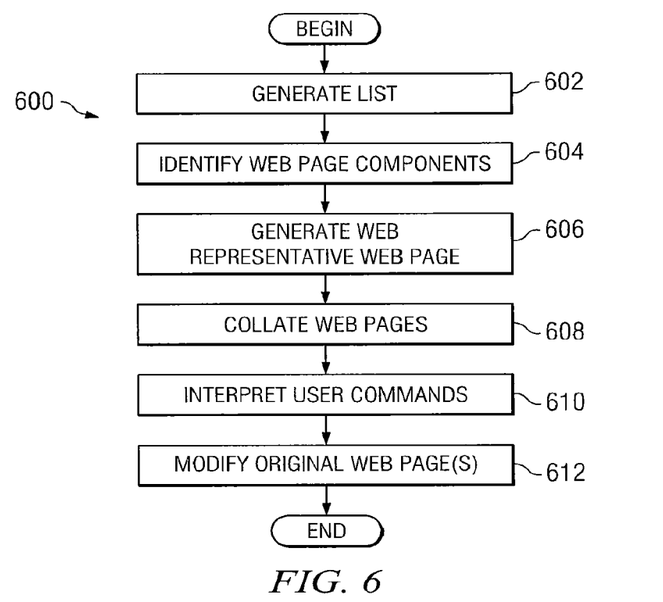
FIG. 6 is a flowchart illustrating various acts related to editing one or more web pages, which acts may be effected, at least in part, by the system of FIG. 1.

FIG. 6 is a flowchart 600 illustrating various acts related to editing one or more web pages. The example acts may be effected, at least in part, by system 100 of FIG. 1. In general, upon a request to edit one or more web pages, the web page(s) are each defined in terms of respective logical components that collectively form the page(s). The acts related to defining the web page(s) in terms of logical components may be effected in a manner substantially similar to that described previously with reference to FIGS. 3 and 4. The defined components are used to generate a displayable representation of the web page, which is sent to browser 114. In response to user input, browser 114 issues commands that are communicated to server 104. The commands are processed, which may include modifying the original web page to reflect any inputted edits, or communicating an updated displayable representation to browser 114. In summary, the example acts described in detail below generally include (1) downloading information, (2) modifying the downloaded information, and (3) uploading the modified information.

In act 602, system 100 generates a list of pages it may edit. For example, server 104 may generate the list in response to a request received from either client 102 or Editor Application 106; or the list may be generated automatically (e.g., in response to an internal computer instruction, a detected event, a periodic trigger, etc.). If the list of editable web pages is finite, for example, server 104 may determine if the list is complete by referencing hierarchical organizations, templates, etc. Within some "community" web site frameworks the list may include, for example, a home page, user profile pages, discussion pages, media pages, etc.

In act 604, each editable web page is defined in terms of logical components, nesting as appropriate, and an identifier is assigned to each component. For example, Editor Application 106 may define the content of a web page encapsulated in a <H1></H1> pair as a header component. In some embodiments, the acts related to defining a web page in terms of logical components and assigning corresponding identifiers may be effected in a manner substantially similar to that described previously with reference to FIGS. 3 and 4.

Act 604 may also involve determining if a particular web page component forms a portion of more than one web page editable by system 100. For example, if multiple instances of a component exist, Editor Application 106 may assign the same identifier to every instance of the component, regardless of the web page on which it appears; alternatively, Editor Application 106 may assign a different identifier to every instance of the component, for example, but include within each different identifier a reference to the other instance(s) of the component.

In act 606, an editable representation of each web page is generated. Each web page representation is effectively itself a web page that emulates, at least in part, a real-world visualization of the particular web page it represents. In this example, Editor Application 106 generates the representations, at least in part, using corresponding web page components defined and identified in act 604. For example, Editor Application 106 may generate an HTML representation of a web page that includes a reference to each previously defined and identified web page component, in addition to any other configuration information. In some embodiments, the reference may be embedded as directly within the HTML code as comments or as well defined HTML attributes (e.g., in a manner substantially similar to that described above with reference to FIGS. 3 and 4). Each representation generated in act 606 may also include a reference to the location of the corresponding web page and a list of any additional elements referenced by the web page, such as, for example, any graphics, Javascript, animations, etc.

In some embodiments, a web page having one or more dynamic components may have more than one representation generated in act 606. For example, a web page that accesses user profile information may have multiple representations generated, each of which may correspond to a respective user profile; or a particular user profile page that has multiple appearances, such as, for example, different appearances based on whether or not a user is logged in, may have multiple representations generated accordingly. In addition, if a dynamic component normally retrieves data external to the component, such data may be replaced by representative data, which may be retrieved, for example, at "runtime" or from a stock data source. For example, the representation of a web page having a video directory component may include a fixed list of ten videos chosen by system 100.

The web page representations generated in act 606 are collated in act 608. For example, the generated representations may be stored at a particular location using relative paths based on the location of respective pages. Any additional elements may also be stored at this particular location, thus ensuring that references to them are encoded to find the correct relative path. In some embodiments, this single location could be a directory with the correct sub directories or a single archive (e.g., .zip or .tar), which encodes the relative location of all the corresponding web pages and components.

In some embodiments, the execution of acts 602, 604, and 606 by system 100 may generate a set of web page representations that collectively emulate the visualization and/or function of a particular web site. The web site emulation, which may include an emulation of dynamic web pages, may thus be viewable by a standalone browser independent of the web site emulated and any associated web site software. That is, at any point in time a user may have the ability to view any of the web page representations using a local browser, independent of the software that may be necessary to fully run a particular web site having dynamic components. In some embodiments, such capability may exist independent of whether the browser is in an online or an offline state.

Act 608 generally includes communicating the web page representations to a browser capable of rendering a display of the representations. For example, browser 114 of client 102 may download each of the generated web page representations. A user can thus view each web page representation on display 110 and edit the representations accordingly. The editing may be effected using any of a variety of tools, including, for example, standard HTML editing tools (e.g., Adobe Dreamweaver, Arachnophilia, Freeway, etc.). Some such tools may include a GUI that enables a user to graphically manipulate the appearance of the web page representations.

A user may thus have any of a variety of editing options and capabilities once the web page representations are downloaded or otherwise communicated. For example, a user may modify the size, location, appearance, and content of the previously defined and identified components forming a particular web page representation. Such modifications may also include adding, removing, or modifying files in the directory hierarchy, or editing any HTML with a plain text editor. In addition, a user may edit any Cascading Style Sheets (CSS), Javascript, images, etc. using standard web editing tools.

Act 610 generally includes interpreting any edits made by a user. For example, at any point in time a user can choose to upload one or more modified web page representations for processing. In some embodiments, the upload request may be in automatic response to browser 114 commands, which are effected by user input (e.g., as a user manipulates one or more components of a web page representation). The processing that may be effected, at least in part, by Editor Application 106. For example, the processing acts effected by Editor Application 106 may include at least some of the acts that follow.

For each uploaded file, Editor Application 106 may determine whether or not the file contains one or more of the previously generated identification tags. If the file contains no such tags, Editor Application 106 stores the file in a location that may later be retrieved by the web site and communicated to browser 114 (e.g., the file may be stored within database 120). If the file contains the identification tags, however, Editor Application 106 may parse the file to determine the tags that identify respective components of the uploaded web pages. Any files which are no longer present in the collection can be marked as deprecated on the web site; and a list of such files may optionally be presented to the user for confirmation before their actual deletion.

In act 612, Editor Application 106 may use the determined identification tags to modify the original web pages, in accordance with their respectively modified web page representations. For example, Editor Application 106 may compare the data associated with a particular component and the corresponding component tag to modify the information system 100 has about the component. In addition, Editor Application 106 may use the component tags to modify the list of components that are currently associated with the corresponding web page, as the user edits might have altered the list. For each new file referenced by the uploaded web page representation, Editor Application 106 may record the location of the new file. In this manner, system 100 may maintain an internal database format that is independent of an actual HTML representation, if using an HTML page presentation.

The above example acts generally apply both to the editing of an entire web site of multiple web pages and to the editing of a single web page. In fact, various embodiments may include (either optionally or always) embedded tags in the final versions of the edited web page(s). In this manner, a user could view the source of a web page that they want to change (within the browser), save the html to their local machine, make the modifications to the layout of that page, and then upload just that single page for processing as part of the upload acts previously described.

In some embodiments, the system 100 may integrate with a source management system such that the versions of the web site can be automatically serialized out as text. In this manner, multiple users may work on different portions of the web site (e.g., different pages or even different components of the same page) and check back in any finalized edits to the integrated system as a whole.

The HTML that may be generated as a result of one or more of the above example acts may also include code in a software language other than HTML. For example, the generated code may include Javascript code that dynamically loads data for the web page representations, thereby making them appear to be more "live" or dynamic as a user makes client-side modifications.

Figure 7:
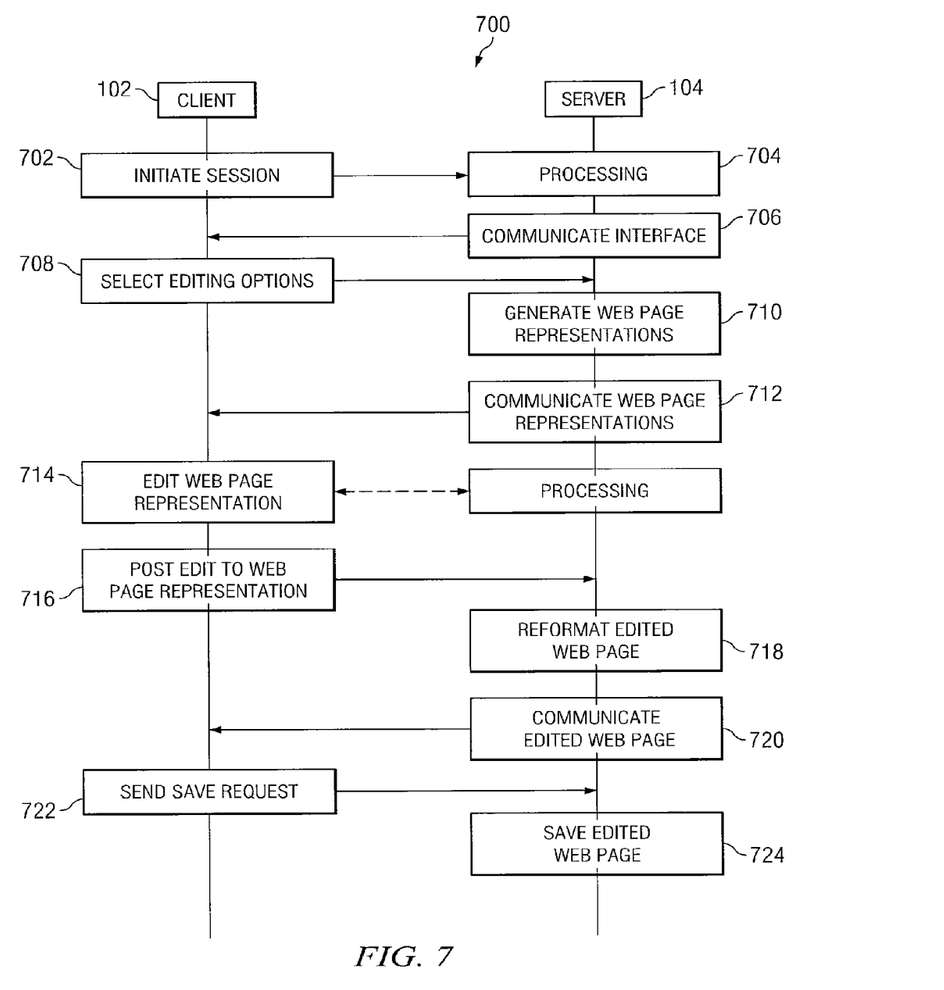
FIG. 7 illustrates a call flow diagram that may be used by the system of FIG. 1 according to one embodiment.

FIG. 7 illustrates a call flow diagram 700 that may be used by system 100 according to one embodiment. Although specific functions and architecture such as the client-server arrangement are presented, other approaches are possible. For example, some or all of the steps and functions described herein can be performed in a standalone system (i.e. without a separate server computer), peer-to-peer, timeshared, etc. In general, any suitable processing architecture, network arrangement or other processing design can be employed for embodiments of the present invention.

In the illustrated example, Client 102 initiates an editing session in act 702. For example, client 102 may communicate to server 104 a request to edit an existing web page (e.g., a web page hosted by server 104), client 102 may request to create a new web page, or client 102 may transfer to server 104 a web page an author has already prepared and desires to further edit. In this example, client 102 uses browser 114 to initiate the session with server 104, which be any of a variety of suitable web browsers.

In response to the session initiation, server invokes server-side processing in act 704. The server-side processing may, by way of example, include at least some of the acts described herein with reference to Editor Application 106. In act 706, the user is provided with an initial interface for invoking basic functions of additional server-side processing. For example, the user may be provided with an option to indicate which original web page(s) to edit; or an option to indicate a new web page is to be created for subsequent editing.

In the illustrated example, a user selects all the web pages of a web site for viewing/editing in act 708. In response, server 104 may generate programmatic representations of the selected original web pages, or otherwise accesses previously generated programmatic representations, in act 710. Some of the programmatic representations may each correspond to respective multiples of the original web pages. That is, a programmatic representation may represent one or more visual or functional aspects of several interrelated web pages. For example, a particular programmatic representation may represent the general features shared by multiple member profile pages that number in the tens, hundreds, thousands, hundreds of thousands, millions, etc.

These programmatic representations include embedded tags and other content associated with the original web pages. The embedded tags may be arranged, for example, in a component format as described previously. The content may be at least partially driven, for example, by data from a server-side database (e.g., database 120).

The programmatic representations may be used to generate one or more respective representations having a format that may be communicated to, and interpreted by, client 102 in act 714. For example, the programmatic representations may be used to generate HTML versions of the original web pages that may be interpreted by browser 114; however, the generated representations communicated to client 102 may use any of a variety of markup descriptions or programming languages, including future descriptions and languages. In some embodiments, the representations communicated to client 102 may also include editing controls and other constructs to facilitate editing. For example, the user may be provided with controls to modify or delete web page components. Tags and other constructs are generally used by browser 114 to provide a formatted display of the programmatic representations, as described previously.

A user performs editing functions in act 714. Any of a variety of client-side web editing tools may be used to perform any of a variety of editing commands and controls (e.g., text editors, HTML editors, HTML GUI editor, etc.) For example, a particular tool may enable the user to browse through the various available web page representations and choose to modify the layout and content of text visible on a particular page. More specifically, the user may select a button to "edit" the block of text and can then add text and reposition the component. Any number of editing acts may be performed to any number of web page representations. In various embodiments, the editing may be performed while client 102 is either online or offline with respect to server 104. For example, in an offline mode, such editing may take place in a manner that is independent of server 104.

At the completion of the editing steps, or at some point during the editing process (e.g., after a dynamic component is selected or modified,) the web page representation(s) is communicated back to server 104 along with modified tags corresponding to the editing steps in act 716. Server 104 receives the edited web page representation(s) and generates a new programmatic representation accordingly in act 718. The act of generating a new programmatic representation may include, for example, dynamically accessing data to update content in accordance with one or more edit commands. The newly generated programmatic representation may be transferred back to client 102 in act 720, where the user can optionally be presented with a refreshed display showing the results of the edit step.

Regardless of whether or not the use has viewed the results of the editing, in act 722, the user may request that the edited text be saved, which results in a post of the current state of the edited web page representation back to server 104. Server 104 replaces the old original web page with the newly edited version of the web page in act 724, such that any dynamic components of the original markup web description are reconstituted. Saving the edited document in standard ("original") format is optional. The document can be stored in a format similar to the web page representation, for example, or in any other suitable format. Saving of an edited version may cause the prior version to be discarded or overwritten; however, many variations are possible. Other embodiments may include additional or less information in the web page representation and may include some information external to the web page representation, as desired.

During the editing process, any amount of time can pass before the user performs an editing or saving step once a web page representation has been provided to client 102. In this respect, the editing approach may be "stateless" with respect to the interaction between client 102 and server 104. That is, the current state of the editing session is not necessarily saved with external variable, but rather may be represented by conditions and states that are embedded within the client-side web page representation. In this manner, a user can edit one or more web pages independent of the communicative status between client 102 and server 104. Thus, a user can start editing a page, disconnect from server 104 for any number of days, and then connect back and continue editing regardless of changes that might occur on the server 104. The state of web page editing and content of the web page being edited is recorded within the client-side web page representation so that when the user does a post (e.g., via selecting a command on the web editing interface) all of the text parts of the original web page are provided as part of the post.

In some embodiments, it may be possible to achieve desirable results with only a portion of the parts of the original web page text included in the web page representation. It may also be desirable to maintain less than a complete self-contained state record in each web page representation; however, such approaches may or may not be strictly "stateless."

Any suitable programming language can be used to implement the various acts of the present disclosure, including future programming languages. Different programming techniques can be employed, such as, for example, procedural or object oriented. The routines can execute on a single processing device or multiple processors.

Although the acts, operations or computations disclosed herein may be presented in a specific order, this order may be changed in different embodiments. In addition, the various acts disclosed herein may be repeated one or more times using any suitable order. In some embodiments, multiple acts described as sequential in this disclosure can be performed at the same time. For example, all or a portion of acts 604 and 606 may be performed substantially simultaneously, or may otherwise be considered a single act. The sequence of operations described herein can be interrupted, suspended, or otherwise controlled by another process, such as an operating system, kernel, etc. The acts can operate in an operating system environment or as stand-alone routines occupying all, or a substantial part, of the system processing.

In the description herein, numerous specific details are provided, such as examples of components, example acts, and/or methods, to provide a thorough understanding of embodiments of the present disclosure. One skilled in the relevant art will recognize, however, that an embodiment of the disclosure can be practiced without one or more of the specific details, or with other apparatus, systems, assemblies, acts, methods, components, materials, parts, etc. In other instances, well-known structures, materials, or operations are not specifically shown or described in detail to avoid obscuring aspects of embodiments of the present disclosure.

A "computer-readable medium" as used herein may be any medium that can contain, or store, the program for use by or in connection with the instruction execution system, apparatus, system or device. The computer readable medium can be, by way of example only but not by limitation, an electronic storage medium, magnetic storage medium, optical storage medium, electromagnetic storage medium, or semiconductor system, apparatus, system, device, or computer memory.

A "processor," "process," or "act" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "particular embodiment," "example embodiment," "illustrated embodiment," "some embodiments," "various embodiments," "one embodiment," or "an embodiment" means that a particular feature, structure, or characteristic described in connection with the embodiment is included in at least one embodiment of the present disclosure and not necessarily in all embodiments. Thus, respective appearances of the phrases "in a particular embodiment," "in one embodiment," "in some embodiments," or "in various embodiments" in various places throughout this specification are not necessarily referring to the same embodiment. Furthermore, the particular features, structures, or characteristics of any specific embodiment of the present disclosure may be combined in any suitable manner with one or more other embodiments. It is to be understood that other variations and modifications of the embodiments of the present disclosure described and illustrated herein are possible in light of the teachings herein and are to be considered as part of the spirit and scope of the present disclosure.

Embodiments of the present disclosure may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present disclosure can be achieved by any means as is known in the art. Distributed, or networked systems, components and circuits can be used. Communication, or transfer, of data may be wired, wireless, or by any other means.

It will also be appreciated that one or more of the elements depicted in FIGS. 1 through 7 can also be implemented in a more separated or integrated manner, or even removed or rendered as inoperable in certain cases, as is useful in accordance with a particular application. It is also within the spirit and scope of the present disclosure to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Additionally, the term "or" as used herein is generally intended to mean "and/or" unless otherwise indicated. Combinations of components or steps will also be considered as being noted, where terminology is foreseen as rendering the ability to separate or combine is unclear.

The foregoing description of illustrated embodiments of the present disclosure, including what is described in the Abstract, is not intended to be exhaustive or to limit the invention to the precise forms disclosed herein. Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for editing a web page comprising:
   identifying a plurality of server-side executable components that collectively form a programmatic representation of a first Hypertext Markup Language (HTML) web page, wherein server-side execution of the server-side executable components causes the first web page to be dynamically generated, at least one of the server-side executable components providing content that dynamically changes in response to execution of the one server-side executable component;

generating a second HTML web page that substantially emulates visually the first HTML web page and comprising a plurality of parameters displayable by a client device, each parameter providing a client-side representation of a corresponding one of the server-side executable components, the second HTML web page enabling a standard HTML editor in the client device to make one or more modifications to at least one of the parameters in the second HTML web page;

interpreting one or more modifications made by the client device to at least one of the parameters as a request for modification of at least a first of the server-side executable components into a modified server-side executable component; and generating, based at least in part on the interpretation, a programmatic representation of a third web page based on modifying the first of the server-side executable components into the modified server-side executable component, enabling the third web page to be dynamically generated by server-side execution of the modified server-side executable component.

2. The method of claim 1, further comprising:
communicating the second web page to the client device;
receiving, from the client device, the one or more modifications made to the at least one of the parameters;
generating a fourth web page based at least in part on the programmatic representation of the third web page; and
communicating the fourth web page to the client device.

3. The method of claim 1, further comprising:
communicating the second web page to a plurality of client devices;
receiving, from each client device, a corresponding one or more modifications made to at least one of the parameters;
generating a fourth web page based at least in part on the programmatic representation of the third web page based on modifying respective ones of the server-side executable components associated with the parameters modified by the client devices; and
communicating the fourth web page to each client device.

4. The method of claim 1, wherein generating the programmatic representation of the third web page further comprises dynamically rendering, using at least data retrieved externally from the content of the programmatic representation of the first web page, at least a portion of the programmatic representation of the third web page.

5. The method of claim 1, wherein the generated programmatic representation of the third page comprises a new server-side executable component that is logically different from, and unrelated to, each server-side executable component of the identified plurality of components that collectively form the programmatic representation of the first web page.

6. The method of claim 1, wherein the plurality of parameters are embedded within content of the second web page.

7. A system for editing a web page comprising:
a server comprising a processor implemented using integrated circuits; and
a web page editor application embodied in one or more non-transitory computer-readable storage media and operable, when executed by the server, to:
identify a plurality of server-side executable components that collectively form a programmatic representation of a first Hypertext Markup Language (HTML) web page, wherein server-side execution of the server-side executable components causes the first web page to be dynamically generated, at least one of the server-side executable components providing content that dynamically changes in response to execution of the one server-side executable component;

generate a second HTML web page that substantially emulates visually the first HTML web page and comprising a plurality of parameters displayable by the client device, each parameter providing a client-side representation of a corresponding one of the server-side executable components, the second HTML web page enabling a standard HTML editor in the client device to make one or more modifications to at least one of the parameters in the second HTML web page;

interpret one or more modifications made by the client device to at least one of the parameters as a request for modification of at least a first of the server-side executable components into a modified server-side executable component; and generate, based at least in part on the interpretation, a programmatic representation of a third web page based on modifying the first of the server-side executable components into the modified server-side executable component, enabling the third web page to be dynamically generated by server-side execution of the modified server-side executable component.

8. The system of claim 7, wherein the web page editor application is further operable, when executed, to:
communicate the second web page to the client device;
receive, from the client device, the one or more modifications made to the at least one of the parameters;
generate a fourth web page based at least in part on the programmatic representation of the third web page; and
communicate the fourth web page to the client device.

9. The system of claim 7, wherein the web page editor application is further operable, when executed, to:
communicate the second web page to a plurality of client devices;
receive, from each client device, a corresponding one or more modifications made to at least one of the parameters;
generate a fourth web page based at least in part on the programmatic representation of the third web page based on modifying respective ones of the server-side executable components associated with the parameters modified by the client devices; and
communicate the fourth web page to each client device.

10. The system of claim 7, wherein the web page editor application is further operable, when executed, to dynamically render, using at least data retrieved externally from the content of the programmatic representation of the first web page, at least a portion of the programmatic representation of the third web page.

11. The system of claim 7, wherein the programmatic representation of the third page comprises a new server-side executable component that is logically different from, and unrelated to, each server-side executable component of the identified plurality of components that collectively form the programmatic representation of the first web page.

12. The system of claim 7, wherein the plurality of parameters are embedded within content of the second web page.

13. Logic embodied in one or more non-transitory computer readable storage media and operable, when executed, to:
identify a plurality of server-side executable components that collectively form a programmatic representation of a first Hypertext Markup Language (HTML) web page, wherein server-side execution of the server-side executable components causes the first web page to be dynamically generated, at least one of the server-side executable components providing content that dynamically changes in response to execution of the one server-side executable component;

generate a second HTML web page that substantially emulates visually the first HTML web page and comprising a plurality of parameters displayable by a client device, each parameter providing a client-side representation of a corresponding one of the server-side executable components, the second HTML web page enabling a standard HTML editor in the client device to make one or more modifications to at least one of the parameters in the second HTML web page;

interpret one or more modifications made by the client device to at least one of the parameters as a request for modification of at least a first of the server-side executable components into a modified server-side executable component; and generate, based at least in part on the interpretation, a programmatic representation of a third web page based on modifying the first of the server-side executable components into the modified server-side executable component, enabling the third web page to be dynamically generated by the server-side execution of the modified server-side executable component.

14. The logic of claim 13, wherein the logic is further operable, when executed, to:

communicate the second web page to the client device;

receive, from the client device, the one or more modifications made to the at least one of the parameters;

generate a fourth web page based at least in part on the programmatic representation of the third web page; and communicate the fourth web page to the client device.

15. The logic of claim 13, wherein the logic is further operable, when executed, to:

communicate the second web page to a plurality of client devices;

receive, from each client device, a corresponding one or more modifications made to at least one of the parameters;

generate a fourth web page based at least in part on the programmatic representation of the third web page based on modifying respective ones of the server-side executable components associated with the parameters modified by the client devices; and communicate the fourth web page to each client device.

16. The logic of claim 13, wherein the logic is further operable, when executed, to dynamically render, using at least data retrieved externally from the content of the programmatic representation of the first web page, at least a portion of the programmatic representation of the third web page.

17. The logic of claim 13, wherein the programmatic representation of the third page comprises a new server-side executable component that is logically different from, and unrelated to, each server-side executable component of the identified plurality of components that collectively form the programmatic representation of the first web page.

18. The logic of claim 13, wherein the plurality of parameters are embedded within content of the second web page.

19. The logic of claim 13, wherein the logic is further operable, when executed, to replace the programmatic representation of the first web page with the programmatic representation of the third web page.

20. The logic of claim 13, wherein the generated programmatic representation of the third web page is a modified version of the programmatic representation of the first web page.

* * * * *